March 21, 1950

D. B. McLOUTH ET AL
MAGNETIC WIRE SOUND RECORDING
AND REPRODUCING APPARATUS 2,501,573

Filed Feb. 14, 1945

3 Sheets-Sheet 1

INVENTORS.
Mortimer A. Neff,
Donald B. McLouth,
BY William P. Haboush.
Harness, Dickey & Pierce
ATTORNEYS.

INVENTORS.
Mortimer A. Neff,
Donald B. McLouth,
William P. Haboush.
BY
Harness, Dickey & Pierce
ATTORNEYS.

March 21, 1950

D. B. McLOUTH ET AL

MAGNETIC WIRE SOUND RECORDING AND REPRODUCING APPARATUS 2,501,573

Filed Feb. 14, 1945

3 Sheets-Sheet 3

INVENTORS.
Mortimer A. Neff,
Donald B. McLouth,
William P. Haboush

BY Harness, Dickey & Pierce

ATTORNEYS.

Patented Mar. 21, 1950

2,501,573

UNITED STATES PATENT OFFICE 2,501,573

MAGNETIC WIRE SOUND RECORDING AND REPRODUCING APPARATUS

Donald B. McLouth, Bloomfield Hills, Mortimer A. Neff, Birmingham, and William P. Haboush, Detroit, Mich., assignors to Wirecorder Corporation, Detroit, Mich., a corporation of Michigan Application February 14, 1945, Serial No. 577,848

18 Claims. (Cl. 179—100.2)

The present invention relates to sound recording and reproducing apparatus of the type employing a magnetized wire as the sound record, and particularly to the mechanical portions of the apparatus which control the movement of the wire.

One object of the present invention is to provide a wire driving mechanism capable of moving the wire through the recording or pickup head of the apparatus at uniform speed in order to avoid distortion of the recorded sound on reproduction.

Another object of the invention is to provide an apparatus of the type mentioned employing an improved removable magazine to carry the wire reel and take-up reel to facilitate changing records.

Another object of the invention is to provide an improved wire driving means which acts directly upon the wire record as distinguished from the wire reel or the take-up reel.

Another object of the invention is to provide an improved wire drive of the type mentioned in combination with means to facilitate application and removal of a detachable wire reel magazine.

A further object of the invention is to provide a wire magazine of the type mentioned incorporating means to prevent free rotation of the wire reels when the magazine is removed from the main chassis of the apparatus.

Other objects and advantages of the invention will become apparent from the following specification, the accompanying drawings, and the appended claims.

Figures 1, 2, 8:
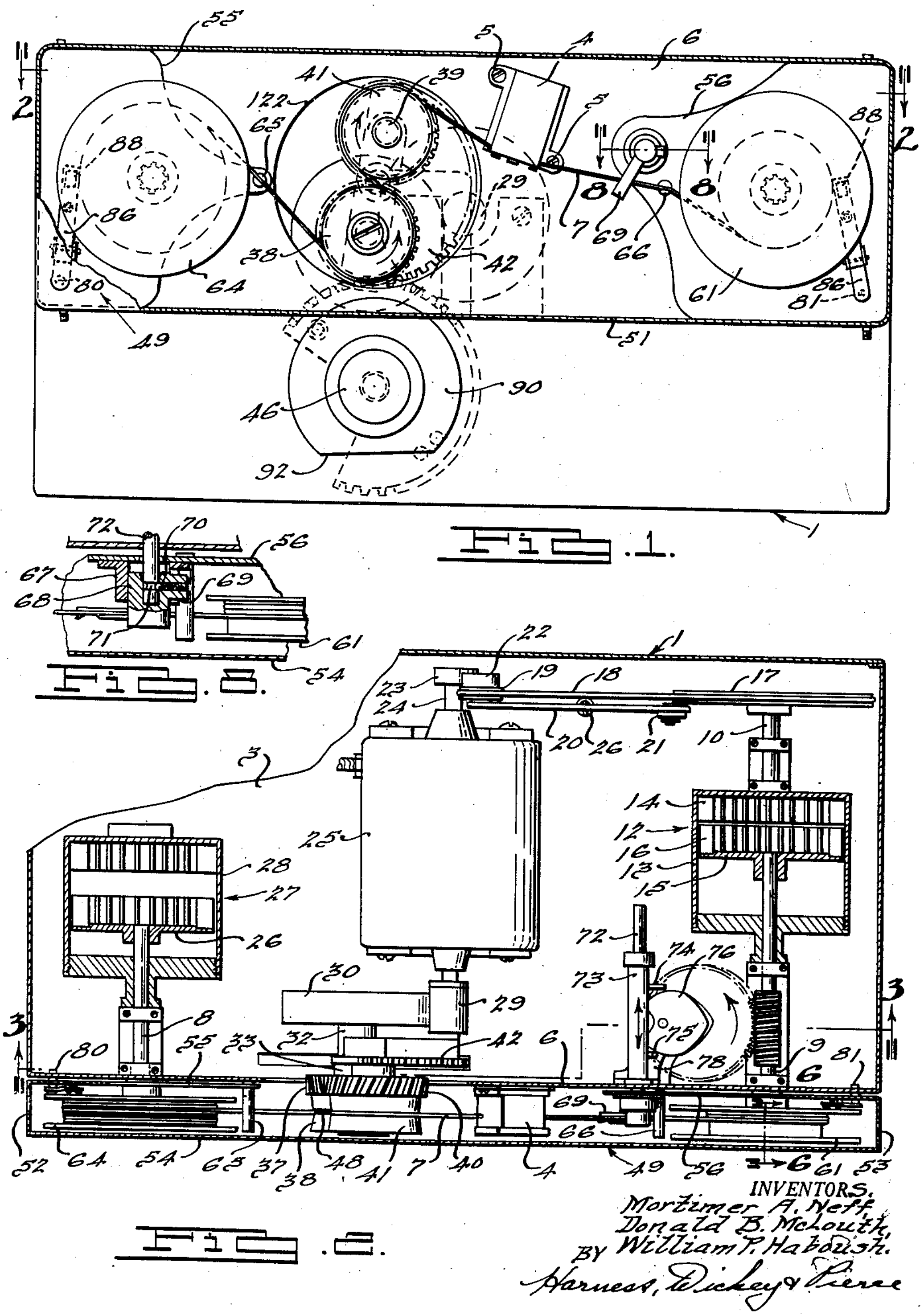
Figure 1 is a front elevation view of the apparatus with the front cover of the magazine broken away to show the interior construction.
Figure 2 is a horizontal section taken on the line 2—2 of Figure 1.
Figure 8 is a fragmentary section taken on the line 8—8 of Figure 1.

Referring to the drawings there is illustrated a generally rectangular casing 1 of a magnetic wire sound recording and reproducing apparatus having a horizontal partition 2 which divides the casing into upper and lower compartments. The upper compartment 3 contains the major portion of the mechanism of the present invention while the lower compartment, shown only in elevation, may contain the amplifying circuits and other electrical features of any suitable or conventional form of wire recording and reproducing apparatus. The only portion of such mechanism illustrated in the present application is the wire recording head or pickup 4, which is secured in any suitable manner, as by a pair of screws 5, to the front wall 6 of the casing 1, and which is adapted to receive and either record upon or respond to a sound record on a traveling wire 7.

Figure 6:
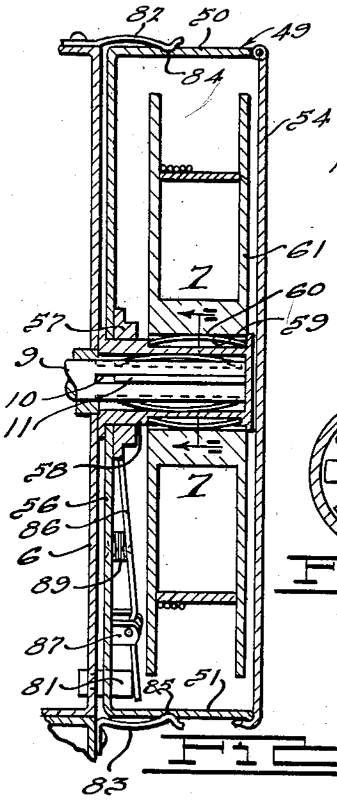
Figure 6 is a section through the magazine taken on the line 6—6 of Figure 2.

As best shown in Figure 2, a pair of spaced parallel reel spindles 8 and 9 are journaled in suitable bearings on the partition 2. The forward ends of the two spindles, which are identical, project through the forward wall 6 of the casing, as best shown in Figure 6, and are provided with a plurality of longitudinally extending slots 10 in which are fitted arched leaf springs 11 which serve to clutch the shaft to winding reels hereinafter described in greater detail. Shaft 9, which carries the take-up reel, is connected to a driven shaft 10 by means of a hydrokinetic coupling indicated generally at 12. Coupling 12 may be of any desired or conventional construction. As illustrated, it comprises a generally cylindrical housing 13 which is fixed to and rotates with the shaft 10 and carries a plurality of radially extending blades 14. The inner end of shaft 9 is fixed to an impeller member 15 having a similar set of radially extending blades 16. The cylindrical casing 13 is closed at both ends and filled to any desired degree with a liquid, with the result that rotation of shaft 10 transmits a yielding, nonpulsating, and highly uniform rotary torque to the shaft 9.

Shaft 10 may be driven in any suitable manner at a speed in excess of the desired reel speed. In the mechanism illustrated, the shaft 10 carries a pulley 17 which is operated by belt 18 from a pulley 19 journaled on the end of a lever 20 pivoted to a fixed bracket 21. A rubber roller 22 fixed to the pulley 19 bears against a roller 23 on the shaft 24 of motor 25. A spring 26 connected between the lever 20 and the partition 2 serves to hold the roller 22 in pressure engagement with the roller 23 in order to make a drive connection.

The reel spindle 8 carries an empeller element 26 of a hydrokinetic coupler 27 which is identical in construction to the coupler 12, except that its casing 28 is fixed against rotation. As a result of this arrangement the coupler 27 acts as a hydrokinetic brake and, therefore, provides a yielding, nonpulsating, and highly uniform resistance to the rotation of the shaft 8.

It is found that by the use of hydrokinetic couplers, such as the couplers 12 and 27 in combination with means for frictionally engaging and feeding the wire at uniform speed, that much greater uniformity in rate of feeding of the wire is obtained than by hitherto known mechanisms. It will be observed that with any means for frictionally engaging and driving the wire, the only force which need be exerted by the wire engaging and driving means is the force necessary to compensate for any difference between the tension imposed upon the wire by shaft 9 and that imposed in the opposite direction by the shaft 8. It is possible, by suitably balancing the torque transmitted by the couplers 12 and 27, to insure that the load imposed upon the wire engaging and driving means is very small and relatively uniform. This eliminates slippage of the wire drive and greatly facilitates maintenance of a uniform rate of speed of the wire.

Figure 3:
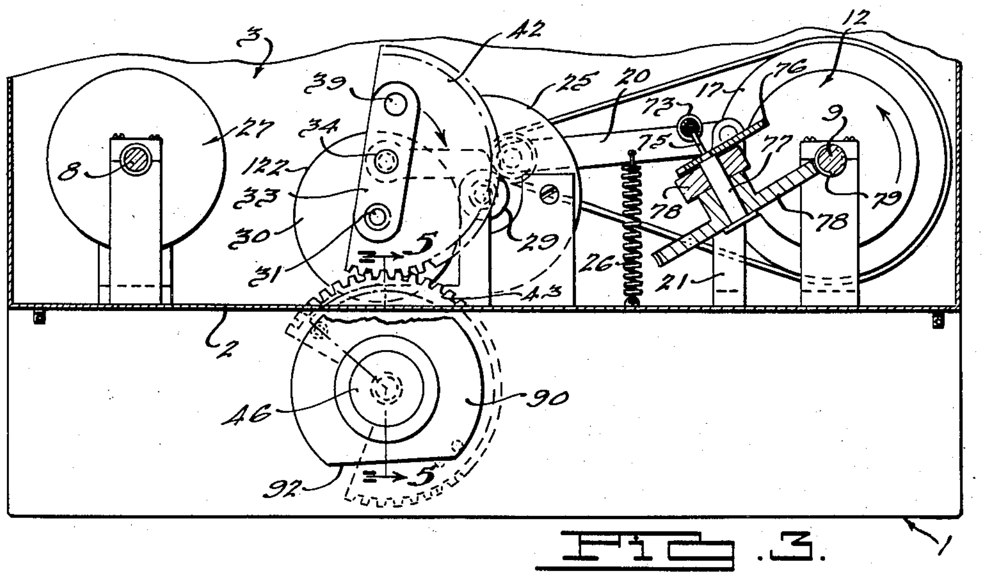
Figure 3 is a section taken on the line 3—3 of Figure 2 showing the lower portion of the chassis in elevation.

While, as previously indicated, any desired means for frictionally engaging and driving wire at constant speed may be employed, the preferred mechanism of the present invention is illustrated in the drawings. The source of power is any suitable constant speed motor 25. If the motor is to be operated from a direct current source it should be compounded or otherwise equipped with means to maintain constant speed of operation under the slight load variations to which it will be subject by the drive of the present invention. Motor 25 carries a rubber roller 29 which, as shown best in Figures 2 and 3, is adapted to engage a roller 30 fixed to a shaft 31 journaled in a boss 32 carried by one end of a lever 33. The lever 33 is pivoted intermediate its ends by means of a pin 34 on the extremity of a bracket 35, the base portion 36 of which rests upon the wall 2 of the casing. The opposite end of the shaft 31 carries a gear 37 and a roller 38, both of which are fixed to the shaft. The opposite end of the lever 33 is provided with a stub shaft 39 on which is journaled a gear 40 and a roller 41, which are fixed together. The gears 37 and 40 are in mesh, with the result that the motor drives the rollers 38 and 41 simultaneously in opposite directions. Any suitable means may be provided for rotating the lever 33. In the embodiment illustrated a gear sector 42 is fixed to lever 33 and meshes with a gear sector 43 shown best in Figures 3 and 5. Sector 43 is fixed to a shaft 44 journaled in a bearing 45 secured to the front wall of the casing. One end of the shaft 44 projects through the wall and carries a control knob 46. Any suitable means, such as the spring pressed ball detent 47 co-operating with suitable recesses formed in the sector 43, is provided to retain the gear sector 43 and knob 46 in any one of two or more positions of adjustment, for reasons hereinafter pointed out.

Figure 4:
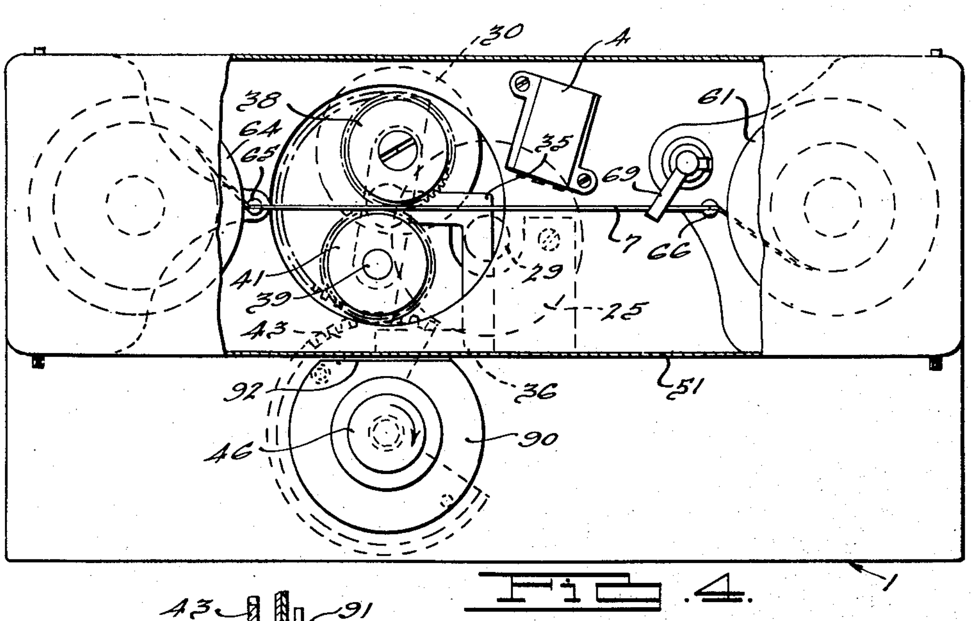
Figure 4 is a view corresponding to Figure 1 with the parts in inoperative or reloading position.

As a result of the above described mechanism the rollers 38 and 40 may be shifted from their normal running position in which the parts assume the position illustrated in Figures 1, 2, and 3 to an inoperative or loading position illustrated in Figure 4. It will be noted that in the latter position, the rollers 38 and 41 are spaced apart on opposite sides of the wire 7 and that the roller 30 is out of contact with the motor roller 29. When the knob 46 is rotated clockwise, as viewed in Figure 4, approximately 180° from the position there illustrated, the gear sector 42 and lever 33 are rotated counterclockwise through an angle of approximately 180°, thereby carrying the rollers 38 and 39 to the drive position best illustrated in Figure 1. In the drive position the wire is wrapped around both rollers through an angle of approximately 180° on each roller, thus providing a very substantial length of contact between the wire and the rollers. As best shown in Figure 2, the peripheries of the rollers are slightly concave and are provided with small V-shaped grooves 48 to receive the wire. This results in a double line contact between the wire and each roller and therefore a more effective grip of the wire by the rollers.

It will be observed that when the rollers are shifted from their inoperative position of Figure 4 to their operative positions of Figures 1, 2, and 3 that the wire 7 is elevated into the slot of the sound recording and reproducing head and thus places the wire in operative position with respect to the head.

All of the mechanism so far mentioned, except the wire 7, is mounted upon the main chassis or casing 1, and there is provided a removable magazine indicated generally at 49 which carries the wire reel, the take-up reel, suitable wire guides, and a portion of the level wind mechanism hereinafter described.

Figure 7:
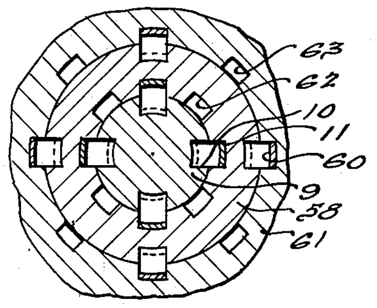
Figure 7 is a section taken on the line 7—7 of Figure 6.

As best shown in Figures 1 to 6, the magazine is in the form of a casing having a top wall 50, a bottom wall 51, and walls 52 and 53, a hinged front cover 54, and a fragmentary back wall formed of a pair of sections 55 and 56 extending inwardly from the end walls 52 and 53, respectively. As best shown in Figure 6, the rear wall section 56 carries a bearing 57 in which is journaled a short tubular shaft 58 adapted to receive the spindle 9 and to be clutched to the spindle 9 by means of the aforementioned springs 11 when the magazine is secured to the chassis. The exterior of the shaft 58 is provided with grooves 59 in which are mounted leaf springs 60 that serve to clutch a take-up reel 61 to the shaft 58. The construction is such that when the hinged front cover 54 is opened the reel 61 may be pulled off the shaft 58 or replaced therein, since the springs, as best shown in Figure 7, only offer a yielding frictional resistance to endwise movement of the reel upon the shaft 58. However, by reason of the slots 62 formed in the interior of the shaft 58 to receive springs 11, and by reason of the similar slots 63 formed on the interior of the reel 61 to receive the springs 60, the spindle 9 is positively connected to the reel 61 and no rotational slippage can occur between them.

A wire reel 64, similar in construction to the reel 61, is journaled upon the rear wall section 55 of the magazine, and connected to the spindle 8 in the same manner as that described in connection with reel 61 and spindle 9.

In addition to the reels 61 and 64 the rear wall sections 55 and 56 carry wire guides 65 and 66, respectively. As best shown in Figures 1 and 2, these wire guides comprise generally cylindrical pins which are rotatably mounted at their inner ends on the rear wall sections of the magazine and which are slotted longitudinally to receive the wire 7. The guides 65 and 66 perform the function of maintaining the path of travel of the wire between the reels in a constant position in a plane transverse to the reel axes independent of the amount of wire of each reel. This insures that when the magazine is secured to the chassis 1, the wire 7 will enter the space between the rollers 38 and 41, as viewed in Figure 4, without any attention on the part of the operator. The guides 65 and 66 are free to rotate under the influence of the wire and thus automatically position the guide slots as required by the direction of wire travel.

The magazine also carries a portion of the level wind mechanism. As best shown in Figure 8, the wall section 56 has fixed thereto a tubular guide in which is slidably positioned a cylindrical boss 68 having a downwardly projecting fork 69, one leg of which lies on each side of the wire 7. The boss 68 has a lateral projection 69 in which is provided a transverse bore having a spring pressed ball detent 70, the ball of which is adapted to enter a groove 71 in a shaft 72, carried by the chassis. It will be noted that one side of the guide 67 is slotted to permit projection of the lateral projection 69 and boss 68. As a result of this arrangement the boss 68, with the wire engaging fork 69, may reciprocate in the guide 67 under the influence of the shaft 72 but cannot rotate.

Any suitable means may be provided within the chassis to reciprocate the shaft 72. As best illustrated in Figure 2, the shaft 72 is slidable in a sleeve 73 fixed at its forward end to the front wall 6 of the casing 1 and a pair of pins 74 and 75 fixed to the shaft 72 projecting through a slot in the sleeve 73 and engage opposite sides of a heart-shaped cam 76. The cam 76 is fixed to a shaft 77 journaled in a bracket 78 fixed to the front wall 6. The lower end of the shaft 77 carries a worm wheel 78 which meshes with a worm 79 on a shaft 9. As a result of this arrangement, on rotation of the shaft 9, the heart-shaped cam is rotated slowly and thereby effects the desired reciprocation of the shaft 72. The fork 69 in turn reciprocates in the same manner and insures that the wire is wound properly on the reel.

In order to locate the magazine on the chassis, the chassis is provided with a pair of fixed pins 80 and 81 which project through the front wall 6 and are adapted to enter suitable openings in opposite corners of the magazine. Any suitable means, such as the leaf spring leaves 82 and 83, shown best in Figure 6, which co-operate with recesses 84 and 85 in the top and bottom walls of the magazine, may be provided to retain the magazine against accidental displacement.

To prevent rotation of the reels 61 and 64 when the magazine is removed from the chassis, there are provided a pair of brake levers 86 pivoted on brackets 87, secured to the rear magazine wall sections 55 and 56, respectively. Each of the levers 86 is provided with a friction pad 88 shown in dotted lines in Figure 1, which is adapted to engage the rear face of the adjacent reel. Each lever 86 is provided with a compression spring 89 normally acting in a direction to cause engagement between the pads 88 and the reels, and thus frictionally resist rotation of the reels when the magazine is removed from the chassis. The brake levers 86 are so located that when the magazine is mounted on the chassis, the locating pins 80 and 81 engage the free ends of the levers 86 and thereby swing the levers in a direction to disengage the friction pads from the reels, as best shown in Figure 6.

Figure 5:
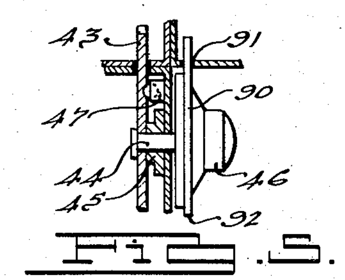
Figure 5 is a fragmentary section taken on the line 5—5 of Figure 3.

In order to prevent removal of the magazine when driving rolls 38 and 41 are in their operative positions illustrated in Figures 1, 2, and 3, the control knob 46 is provided with a radially projecting flange 90, which, as best shown in Figure 5, is adapted to project into a slot 91 formed in the bottom wall 51 of the magazine when the drive rolls are in driving position. The radial flange 90 is provided with a cutaway segment forming a straight edge portion 92 which will be located entirely below the bottom wall 51 of the magazine when the drive rolls 38 and 41 are rotated to their inoperative position shown in Figure 4. This insures that the rolls 38 and 41 will be disengaged from the wire before the magazine is removed. This mechanism also serves to prevent installation of the magazine when the rolls 38 and 41 are out of the position illustrated in Figure 4.

Figure 10:
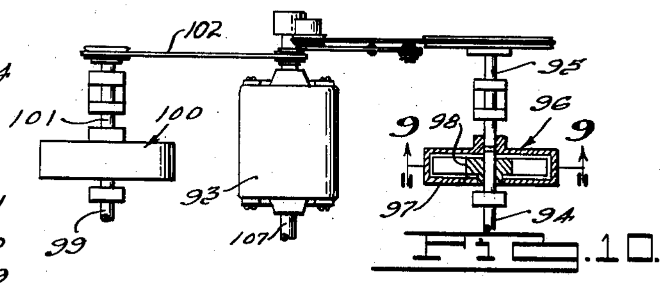
Figure 10 is a fragmentary elevation view showing a modified form of the invention.
Figure 9:
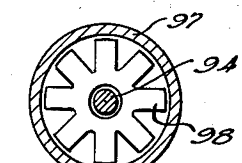
Figure 9 is a section taken on the line 9—9 of Figure 10.

An important feature of the present invention resides in the use of a coupling in the drive to the take-up reel and a brake on the wire reel for transmitting a yielding and nonchattering torque. The hydrokinetic clutches 12 and 27 supply the desired characteristics to a high degree, but similar results may also be accomplished by the use of electromagnetic couplings, and an alternative drive incorporating one of the simplest forms of such coupling is illustrated in Figures 9 and 10. As shown in Figure 10, the motor 93 is connected to a take-up reel spindle 94 in the same manner as that illustrated and described in connection with Figures 1 to 4, except that in place of the hydrokinetic coupling there is incorporated between the take-up spindle 94 and the shaft 95, which drives the same, a coupling in the form of an eddy-current motor, indicated generally at 96. The coupling 96 comprises a cylindrical casing 97 fixed to the shaft 95 and a multipole permanent magnet rotor 98 fixed to the shaft 94. The rotor is provided with any desired number of poles, eight being illustrated in Figure 9, of alternate north and south polarity. As is well known, relative rotation between the housing 97 and the rotor 98 will set up eddy currents in the housing which create a field that reacts with the rotor and thereby resists rotation of the rotor relative to the housing. As a result, by rotating the housing 97, it is possible to transmit by electromotive force a driving torque to the rotor 98 of the desired uniform yielding characteristics. The same type of construction may be employed upon the wire spindle 99 except that the coupling or brake 100, which is employed in connection with the spindle 99 will have either a stationary housing or, as illustrated in Figure 10, may be fixed to a shaft 101, which is rotated by a belt 102 and suitable pulleys on the motor shaft and shaft 101 in a direction opposite to the direction in which the spindle 99 rotates during the unwinding of the wire reel mounted on spindle 99. This rotation of the housing increases the braking resistance offered by the coupling or brake 100.

Figures 11, 12:
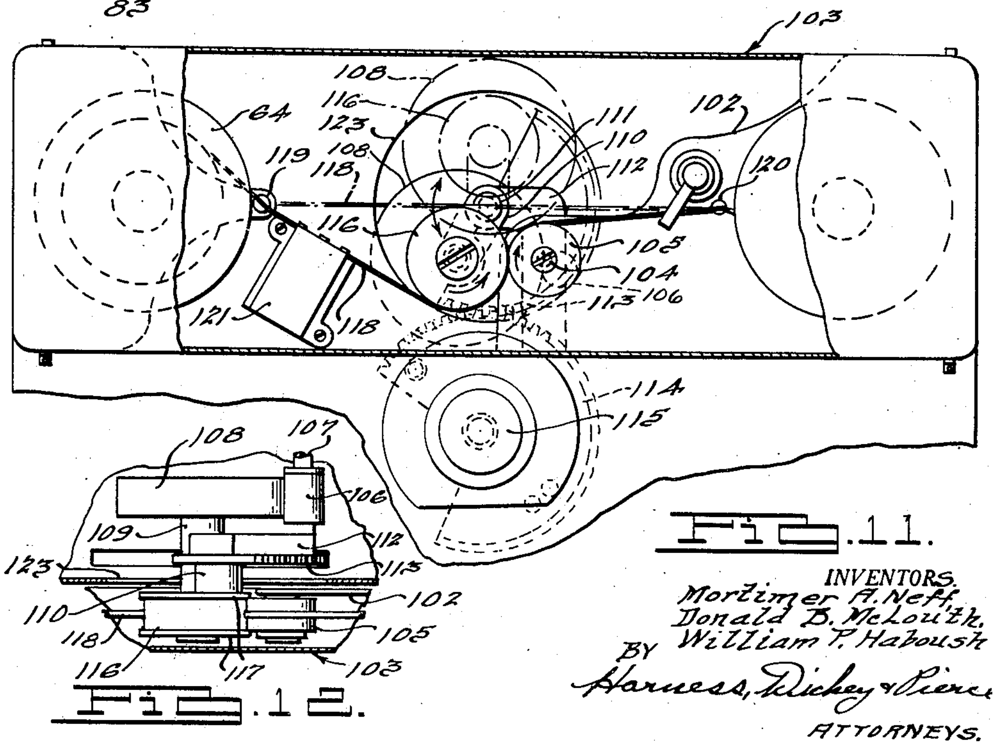
Figure 11 is a view corresponding to Figure 1 of a further modification of the invention.
Figure 12 is a fragmentary horizontal section showing the wire driving means of the modification illustrated in Figure 11.

In Figures 11 and 12 there is illustrated a slightly modified form of magazine and wire driving mechanism. All features in the modified construction may be identical to either of the constructions previously described except that only one of the wire driving rolls is shifted in position and the other roll, instead of being mounted on the chassis, is journaled in fixed position on the magazine. In addition, the sound recording or pickup head is located in a different position. Accordingly, only those features of the mechanism will be described.

As shown in Figures 11 and 12, the rear wall section 102 of the magazine 103 carries a spindle 104 upon which is journaled a cylindrical rubber roller 105. A rubber roller 106, mounted upon the motor shaft 107 is adapted to engage and drive a roller 108 fixed to a shaft which is journaled within a boss 109 carried by one end of a lever 110. The opposite end of the lever is pivoted by means of a pin 111 on the extremity of a bracket 112, the lower end of which is fixed to a horizontal partition in the chassis. The lever 110 has fixed thereto a gear segment 113 adapted to co-operate with a corresponding gear segment 114 which in turn is fixed to a control knob 115 journaled in the front wall of the chassis. The segments 113 and 114 and the control knob 115 are similar in construction and mode of operation to the corresponding segments and control knob in Figures 1 to 5.

The forward end of the shaft which carries the roller 108 has fixed thereto a cylindrical roller 116 having radially extending flanges 117. As a result of the above described arrangement, the roller 116 may be shifted from an inoperative dotted line position shown in Figure 11, in which the roller 117 lies above the path of travel of the wire 118 between the guides 119 and 120, and the roller 108 is out of engagement with the roller 106, to the solid line position in Figures 11 and 12, in which the roller 108 engages and is driven by the roller 106 and the wire is wrapped around a substantial portion of the periphery of the rollers 105 and 116 and is tightly pinched between them. It will be noted that in this position the flanges 117 of the roller 116 embrace the sides of the roller 105 to prevent the wire from running off either of the rollers.

Movement of the roller 116 from its inoperative to its operative position shifts the wire 118 from its dotted line position illustrated in Figure 1 to its solid line position, in which it enters the groove of the sound recording and reproducing head 121. It will be observed that in the construction illustrated in Figures 1 to 4 that the front wall 3 of the chassis is provided with a circular opening 122 through which the rollers 38 and 41 project, and that a similar opening 123 is provided in the front wall of the chassis of Figures 11 and 12, through which projects the lever 110.

It will be apparent that there is provided, in accordance with the present invention, an exceedingly simple and effective means to assure a uniform speed of travel of a wire record in an apparatus of the type described. While the rolls 38, 41, 105, and 116 have been referred to herein as "drive rolls" they do not necessarily supply any of the force necessary to move the wire. In the ideal condition the tension applied by the take-up spool to the wire just balances the retarding force applied by the wire reels and, consequently, no force need be applied to the wire by the so-called drive rolls. Their sole function is to compensate for the slight variations in tension applied by the reels to the wire and hence they may properly be considered speed control rollers rather than drive rollers.

It is also apparent that there is provided, in accordance with the present invention, two simple and practical detachable magazine constructions which eliminate the necessity of threading the wire through the driving mechanism, the level wind mechanism, and the sound reproducing or recording head by hand, which would otherwise be required. The improved magazine also incorporates means to prevent unintentional unwinding of the wire when the magazine is removed from the chassis, and the two forms of drive means are peculiarly adapted for use with a removable magazine, since they may be readily shifted from an inoperative position in which they do not engage the wire to one in which they make an effective driving engagement and automatically insert the wire in the head. The ball detent mechanism associated with the sector which is fixed to the control knob serves to maintain the drive rollers either in their operative or inoperative positions. If desired, the motor switch may also be connected to the control knob in such a manner that the motor is energized when the drive rollers are shifted to operative position.

While several forms of the invention have been illustrated and described herein, it is apparent that further modifications may be indulged in within the spirit of the invention and within the scope of the appended claims.

What is claimed is:

1. In a magnetic wire sound recording and reproducing apparatus, a detachable reel magazine provided with a pair of wire reels one of which is adapted to receive wire from the other, a pair of wire engaging rollers journaled on parallel axes and relatively movable from a position in which they present an open throat between them to receive a straight stretch of wire extending between said reels upon movement of the wire reel magazine parallel to said axes and transverse to the wire axis to a position in which said wire is wrapped partially around both rollers, means for shifting said rollers from one of said positions to the other, means for rotating at least one of said rollers at a constant speed, and means for preventing removal of said magazine from said apparatus when said rollers are in said second position.

2. In a magnetic wire sound recording and reproducing apparatus, a pair of wire engaging rollers journaled on parallel axes and relatively movable from a position in which they present an open throat between them to receive a straight stretch of wire upon movement of the wire parallel to said axes and transverse to the wire axis to a position in which said wire is wrapped partially around both rollers, means for shifting said rollers from one of said positions to the other, electromagnetic means having an open slot to receive said wire and adapted to impress or respond to a magnetic sound record on the wire as it passes from one reel to the other, said electromagnetic means being so located with respect to said reels and said rollers that on movement of said rollers into said second position the wire is moved into said open slot, and means for rotating at least one of said rollers at constant speed.

3. In a magnetic wire sound recording and reproducing apparatus, a detachable reel magazine provided with a pair of wire reels one of which is adapted to receive wire from the other, a pair of wire engaging rollers journaled on parallel axes and relatively movable from a position in which they present an open throat between them to receive a straight stretch of wire extending between said reels upon movement of the wire reel magazine parallel to said axes and transverse to the wire axis to a position in which said wire is wrapped partially around both rollers, means for shifting said rollers from one of said positions to the other, electromagnetic means having an open slot to receive said wire and adapted to impress or respond to a magnetic sound record on the wire as it passes from one reel to the other, said electromagnetic means being so located with respect to said reels and said rollers that on movement of said rollers into said second position the wire is moved into said open slot, and means for rotating at least one of said rollers at constant speed.

4. In a magnetic wire sound recording and reproducing apparatus, a detachable reel magazine provided with a pair of wire reels one of which is adapted to receive wire from the other, a pair of wire engaging rollers journaled on parallel axes and relatively movable from a position in which they present an open throat between them to receive a straight stretch of wire extending between said reels upon movement of the wire reel magazine parallel to said axes and transverse to the wire axis to a position in which said wire is wrapped partially around both rollers, means for shifting said rollers from one of said positions to the other, electromagnetic means having an open slot to receive said wire and adapted to impress or respond to a magnetic sound record on the wire as it passes from one reel to the other, said electromagnetic means being so located with respect to said reels and said rollers than on movement of said rollers into said second position the wire is moved into said open slot, means for rotating at least one of said rollers at constant speed, and means for preventing removal of said magazine from said apparatus when said rollers are in said second position.

5. In a magnetic wire sound recording and reproducing apparatus, a support pivoted for rotation on said apparatus, a pair of rollers journaled on said support on axes parallel to the axis of the support pivot and spaced to present an open throat between the rollers to receive a straight stretch of wire upon movement of the wire parallel to the axes of the rollers and transverse to the axis of the wire, means to rotate said support to cause the wire to be wrapped partially around each roller, and means to drive at least one of said rollers at constant speed.

6. In a magnetic wire sound recording and reproducing apparatus, a detachable reel magazine provided with a pair of wire reels one of which is adapted to receive wire from the other, a support pivoted for rotation on said apparatus, a pair of rollers journaled on said support on axes parallel to the axis of the support pivot and spaced to present an open throat between the rollers to receive a straight stretch of wire extending between said reels upon movement of the wire reel magazine parallel to the axes of the rollers and transverse to the axis of the wire, means to rotate said support to cause the wire to be wrapped partially around each roller, and means to drive at least one of said rollers at constant speed.

7. In a magnetic wire sound recording and reproducing apparatus, a support pivoted for rotation on said apparatus, a pair of rollers journaled on said support on axes parallel to the axis of the support pivot and spaced to present an open throat between the rollers to receive a straight stretch of wire upon movement of the wire parallel to the axes of the rollers and transverse to the axis of the wire, means to rotate said support to cause the wire to be wrapped partially around each roller, electromagnetic means having an open slot to receive said wire and adapted to impress or respond to a magnetic sound record on the wire as it passes from one reel to the other, said electromagnetic means being so located with respect to said reels and said rollers that on movement of said rollers into said second position the wire is moved into said open slot, and means to drive at least one of said rollers at constant speed.

8. In a magnetic wire sound recording and reproducing apparatus, a detachable reel mazagine provided with a pair of wire reels one of which is adapted to receive wire from the other, a support pivoted for rotation on said apparatus, a pair of rollers journaled on said support on axes parallel to the axis of the support pivot and spaced to present an open throat between the rollers to receive a straight stretch of wire extending between said reels upon movement of the wire reel magazine parallel to the axes of the rollers and transverse to the axis of the wire, means to rotate said support to cause the wire to be wrapped partially around each roller, electromagnetic means having an open slot to receive said wire and adapted to impress or respond to a magnetic sound record on the wire as it passes from one reel to the other, said electromagnetic means being so located with respect to said reels and said rollers that on movement of said rollers into said second position the wire is moved into said open slot, and means to drive at least one of said rollers at constant speed.

9. In a magnetic wire sound recording and reproducing apparatus, a detachable reel magazine provided with a pair of wire reels one of which is adapted to receive wire from the other, a support movably mounted on said apparatus, a roller journaled for rotation on said support on an axis transverse to the direction of movement of said support relative to said apparatus, a second roller journaled on an axis parallel to the first axis, there being an open throat between said rollers to receive a straight stretch of wire extending between said reels upon movement of the wire reel magazine parallel to said axes and transverse to the wire axis when the support is in one position, means for shifting said support to cause the first roller to displace the wire and wrap it partially about both rollers, and means to drive one of said rollers.

10. In a magnetic wire sound recording and reproducing apparatus, a detachable reel magazine provided with a pair of wire reels one of which is adapted to receive wire from the other, a support movably mounted on said apparatus, a roller journaled for rotation on said support on an axis transverse to the direction of movement of said support relative to said apparatus, a second roller journaled on an axis parallel to the first axis, there being an open throat between said rollers to receive a straight stretch of wire extending between said reels upon movement of the wire reel magazine parallel to said axes and transverse to the wire axis when the support is in one position, means for shifting said support to cause the first roller to press the wire against the second roller and to displace the wire and wrap it partially about both rollers, and means to drive one of said rollers.

11. In a magnetic wire sound recording and reproducing apparatus, a support movably mounted on said apparatus, a roller journaled for rotation on said support on an axis transverse to the direction of movement of said support relative to said apparatus, a second roller journaled on an axis parallel to the first axis, there being an open throat between said rollers to receive a straight stretch of wire upon movement of the wire parallel to said axes and transverse to the wire axis when the support is in one position, means for shifting said support to cause the first roller to displace the wire and wrap it partially about both rollers, electromagnetic means having an open slot to receive said wire and adapted to impress or respond to a magnetic sound record on the wire as it passes from one reel to the other, said electromagnetic means being so located with respect to said reels and said rollers that on movement of said support into said second position the wire is moved into said open slot, and means to drive one of said rollers.

12. In a magnetic wire sound recording and reproducing apparatus, a support movably mounted on said apparatus, a roller journaled for rotation on said support on an axis transverse to the direction of movement of said support relative to said apparatus, a second roller journaled on an axis parallel to the first axis, there being an open throat between said rollers to receive a straight stretch of wire upon movement of the wire parallel to said axes and transverse to the wire axis when the support is in one position, means for shifting said support to cause the first roller to press the wire against the second roller and to displace the wire and wrap it partially about both rollers, electromagnetic means having an open slot to receive said wire and adapted to impress or respond to a magnetic sound record on the wire as it passes from one reel to the other, said electromagnetic means being so located with respect to said reels and said rollers that on movement of said support into said second position the wire is moved into said open slot, and means to drive one of said rollers.

13. In a magnetic wire sound recording and reproducing apparatus, a detachable reel magazine provided with a pair of wire reels one of which is adapted to receive wire from the other, a support movably mounted on said apparatus, a roller journaled for rotation on said support on an axis transverse to the direction of movement of said support relative to said apparatus, a second roller journaled on an axis parallel to the first axis, there being an open throat between said rollers to receive a straight stretch of wire extending between said reels upon movement of the wire reel magazine parallel to said axes and transverse to the wire axis when the support is in one position, means for shifting said support to cause the first roller to displace the wire and wrap it partially about both rollers, electromagnetic means having an open slot to receive said wire and adapted to impress or respond to a magnetic sound record on the wire as it passes from one reel to the other, said electromagnetic means being so located with respect to said reels and said rollers that on movement of said support into said second position the wire is moved into said open slot, and means to drive one of said rollers.

14. In a magnetic wire sound recording and reproducing apparatus, a detachable reel magazine provided with a pair of wire reels one of which is adapted to receive wire from the other, a support movably mounted on said apparatus, a roller journaled for rotation on said support on an axis transverse to the direction of movement of said support relative to said apparatus, a second roller journaled on an axis parallel to the first axis, there being an open throat between said rollers to receive a straight stretch of wire extending between said reels upon movement of the wire reel magazine parallel to said axes and transverse to the wire axis when the support is in one position, means for shifting said support to cause the first roller to press the wire against the second roller and to displace the wire and wrap it partially about both rollers, electromagnetic means having an open slot to receive said wire and adapted to impress or respond to a magnetic sound record on the wire as it passes from one reel to the other, said electromagnetic means being so located with respect to said reels and said rollers that on movement of said support rollers into said second position the wire is moved into said open slot, and means to drive one of said rollers.

15. In a magnetic wire sound recording and reproducing apparatus, a support movably mounted on said apparatus, a roller journaled for rotation on said support on an axis transverse to the direction of movement of said support relative to said apparatus, a second roller journaled on an axis parallel to the first axis, there being an open throat between said rollers to receive a straight stretch of wire upon movement of the wire parallel to said axes and transverse to the wire axis when the support is in one position, means for shifting said support to cause the first roller to displace the wire and establish a driving connection between the wire and at least one of the rollers, electromagnetic means having an open slot to receive said wire and adapted to impress or respond to a magnetic sound record on the wire as it passes from one reel to the other, said electromagnetic means being so located with respect to said reels and said rollers that on movement of said support into said second position the wire is moved into said open slot, and means to drive one of said rollers.

16. In a magnetic wire sound recording and reproducing apparatus, a support movably mounted on said apparatus, a roller journaled for rotation on said support on an axis transverse to the direction of movement of said support relative to said apparatus, a second roller journaled on an axis parallel to the first axis, there being an open throat between said rollers to receive a straight stretch of wire upon movement of the wire parallel to said axes and transverse to the wire axis when the support is in one position, means for shifting said support to cause the first roller to displace the wire and clamp it between said rollers, electromagnetic means having an open slot to receive said wire and adapted to impress or respond to a magnetic sound record on the wire as it passes from one reel to the other, said electromagnetic means being so located with respect to said reels and said rollers that on movement of said support into said second position the wire is moved into said open slot, and means to drive one of said rollers.

17. In a magnetic wire sound recording and reproducing apparatus, a detachable reel magazine provided with a pair of wire reels one of which is adapted to receive wire from the other, a support movably mounted on said apparatus, a roller journaled for rotation on said support on an axis transverse to the direction of movement of said support relative to said apparatus, a second roller journaled on an axis parallel to the first axis, there being an open throat between said rollers to receive a straight stretch of wire extending between said reels upon movement of the wire reel magazine parallel to said axes and transverse to the wire axis when the support is in one position, means for shifting said support to cause the first roller to displace the wire and establish a driving connection between the wire and at least one of the rollers, electromagnetic means having an open slot to receive said wire and adapted to impress or respond to a magnetic sound record on the wire as it passes from one reel to the other, said electromagnetic means being so located with respect to said reels and said rollers that on movement of said support into said second position the wire is moved into said open slot, and means to drive one of said rollers.

18. In a magnetic wire sound recording and reproducing apparatus, a detachable reel magazine provided with a pair of wire reels one of which is adapted to receive wire from the other, a support movably mounted on said apparatus, a roller journaled for rotation on said support on an axis transverse to the direction of movement of said support relative to said apparatus, a second roller journaled on an axis parallel to the first axis, there being an open throat between said rollers to receive a straight stretch of wire extending between said reels upon movement of the wire reel magazine parallel to said axes and transverse to the wire axis when the support is in one position, means for shifting said support to cause the first roller to displace the wire and clamp it between said rollers, electromagnetic means having an open slot to receive said wire and adapted to impress or respond to a magnetic sound record on the wire as it passes from one reel to the other, said electromagnetic means being so located with respect to said reels and said rollers that on movement of said support into said second position the wire is moved into said open slot, and means to drive one of said rollers.

DONALD B. McLOUTH.
MORTIMER A. NEFF.
WILLIAM P. HABOUSH.

REFERENCES CITED

The following references are of record in the file of this patent:

UNITED STATES PATENTS

| Number | Name | Date |
|---|---|---|
| 534,693 | Kenworthy | Feb. 26, 1895 |
| 789,336 | Poulsen | May 9, 1905 |
| 1,237,496 | Fankhauser | Aug. 21, 1917 |
| 1,665,784 | Hornauer | Apr. 10, 1928 |
| 1,691,414 | Thornton | Nov. 13, 1928 |
| 1,718,355 | Hutchison | June 25, 1929 |
| 1,792,690 | Hamer | Feb. 17, 1931 |
| 1,844,224 | Klappenecker | Feb. 9, 1932 |
| 1,935,210 | Hopkins | Nov. 14, 1933 |
| 2,091,756 | Fodor | Aug. 31, 1937 |
| 2,154,847 | Hill | Apr. 18, 1939 |
| 2,251,322 | Buhrendorf | Aug. 5, 1941 |
| 2,275,961 | Heller | Mar. 10, 1942 |
| 2,306,660 | Gift | Dec. 29, 1942 |
| 2,321,812 | Heller | June 15, 1943 |
| 2,351,007 | Camras | June 13, 1944 |
| 2,351,010 | Camras | June 13, 1944 |
| 2,369,017 | Camras | Feb. 6, 1945 |
| 2,384,637 | Owens | Sept. 11, 1945 |
| 2,401,632 | Greenleaf | June 4, 1946 |

FOREIGN PATENTS

| Number | Country | Date |
|---|---|---|
| 93,789 | Sweden | Dec. 14, 1948 |